United States Patent [19]

Dinnerstein

[11] 3,738,319
[45] June 12, 1973

[54] AQUARIUM

[75] Inventor: Albert J. Dinnerstein, Far Rockaway, N.Y.

[73] Assignee: Metaframe Corporation, Maywood, N.J.

[22] Filed: Apr. 2, 1971

[21] Appl. No.: 130,599

[52] U.S. Cl. ................................................ 119/5
[51] Int. Cl. .......................................... A01k 64/00
[58] Field of Search ................. 119/5; 220/82 R, 220/84, 4 R

[56] References Cited
UNITED STATES PATENTS

| 2,792,811 | 5/1957 | Di Chiaro | 119/5 |
| 2,205,686 | 6/1940 | Ehrlich | 220/82 R |
| 2,713,847 | 7/1955 | Blaise | 119/5 |
| 3,167,051 | 1/1965 | Hovlid | 119/5 |

FOREIGN PATENTS OR APPLICATIONS 423,945  2/1935  Great Britain

Primary Examiner—Hugh R. Chamblee
Attorney—Friedman & Goodman

[57] ABSTRACT

An aquarium having a rectangular array of adjoining panels includes a sealant for connecting the panels to one another such that one panel intersects an adjoining panel at a point remote from each of the opposite ends of the latter panel. Corner brace members are provided for stabilizing adjoining panels at respective corners and for covering the sealant externally of the aquarium enclosure.

14 Claims, 22 Drawing Figures

PATENTED JUN 12 1973 3,738,319

ALBERT J. DINNERSTEIN
INVENTOR

By Friedman + Goodman
ATTORNEYS

ALBERT J. DINNERSTEIN
INVENTOR

ATTORNEYS

PATENTED JUN 12 1973 3,738,319

ALBERT J. DINNERSTEIN
INVENTOR

By Friedman Hoobens
ATTORNEYS

ALBERT J. DINNERSTEIN
INVENTOR

ATTORNEYS

ALBERT J. DINNERSTEIN
INVENTOR

ATTORNEYS 3,738,319

AQUARIUM

BACKGROUND OF THE INVENTION

The present invention relates to fish tank aquariums, and more particularly to a method and means for assembling the adjoining transparant panels thereof.

Fish tank aquariums must be constructed so that they feature stability, rigidity, and leakage resistance of extreme reliability. Aquariums inherently feature a bulky construction, and as a result are difficult to protect when being shipped from the manufacturer to the distributor or purchaser. Accordingly, many aquariums suffer breakage of the glass panels, and others lose their sealing resistance as a result of being jarred respectively. Measures can be taken to prevent glass breakage during packing, but few measures, during packing, have been successful in preventing the aquariums from losing their sealing resistance. This is partly because of the heavy and bulky construction of the aquariums and the rather thin layer of sealant employed and incorporated heretofore. Loss of sealing resistance is also partly attributed to the rather ineffective corner brace members utilized for bracing and connecting adjoining panels.

Furthermore, during the life of the aquarium, the water, whether salty or fresh, continually contacts the sealant and gradually erodes the latter. The rather thin layer of sealant is thus destroyed after a time and requires inconvenient replacement.

The present invention obviates the above disadvantages.

SUMMARY OF THE INVENTION

The present invention is related to the construction of a fish tank aquarium having a rectangular array of adjoining panels. The panels are connected such that one panel intersects an adjoining panel at a point remote from each of the opposite ends of the latter panel. The intersecting end portions define an L-shaped section externally of the enclosure and in which a sealant is interposed. Corner brace members are provided for covering the sealant and have a configuration for more rigidly stabilizing the adjoining panels.

It is therefore an object of the present invention to provide an aquarium that is stable, rigid and features leakage resistance of extreme reliability.

It is a further object to connect adjoining panels such that the sealant is maintained externally of the enclosure of the aquarium so that the sealant is free from exposure to the liquid in the aquarium.

It is still a further object to maintain the sealant as a thickened mass to decrease the potential thereof to erode during the life of the aquarium.

It is another object to provide corner brace members having inclined portions for enveloping the sealant and stabilizing the interconnected adjoining panels.

It is still another object of the present invention to provide a method for interconnecting the adjoining panels.

BRIEF DESCRIPTION OF THE DRAWINGS

With the above and additional objects and advantages in view as will hereinafter appear, this invention comprises the devices, combinations, and arrangements of parts hereinafter described and illustrated in the accompanying drawings of a preferred embodiment in which.

DETAILED DESCRIPTION OF THE INVENTION

Figure 1:
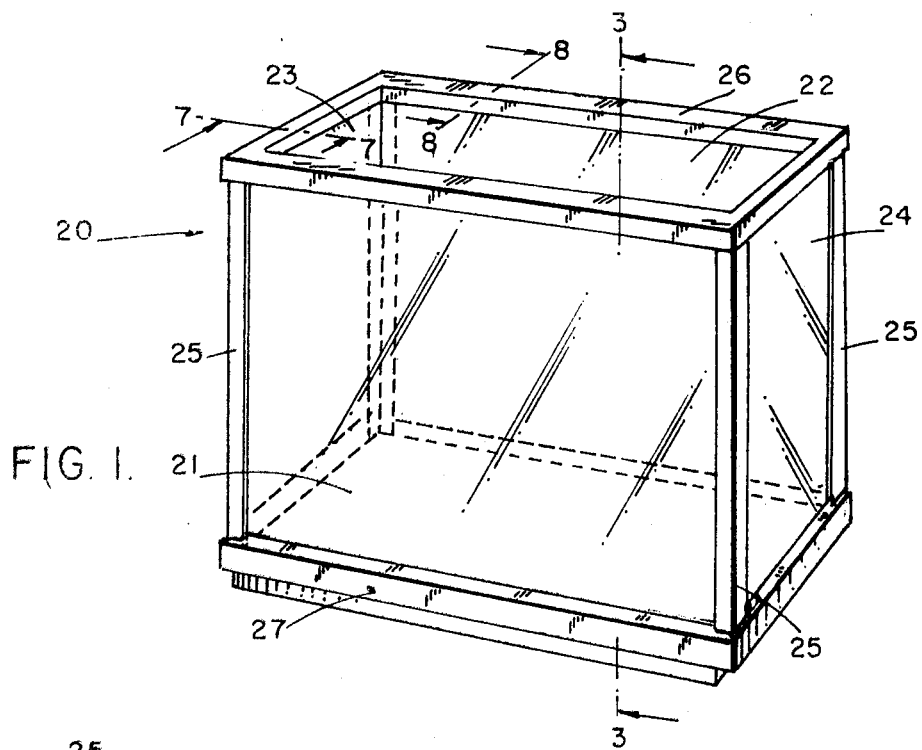
FIG. 1 represents a perspective view of the aquarium according to the invention in assembled form.
Figure 2:
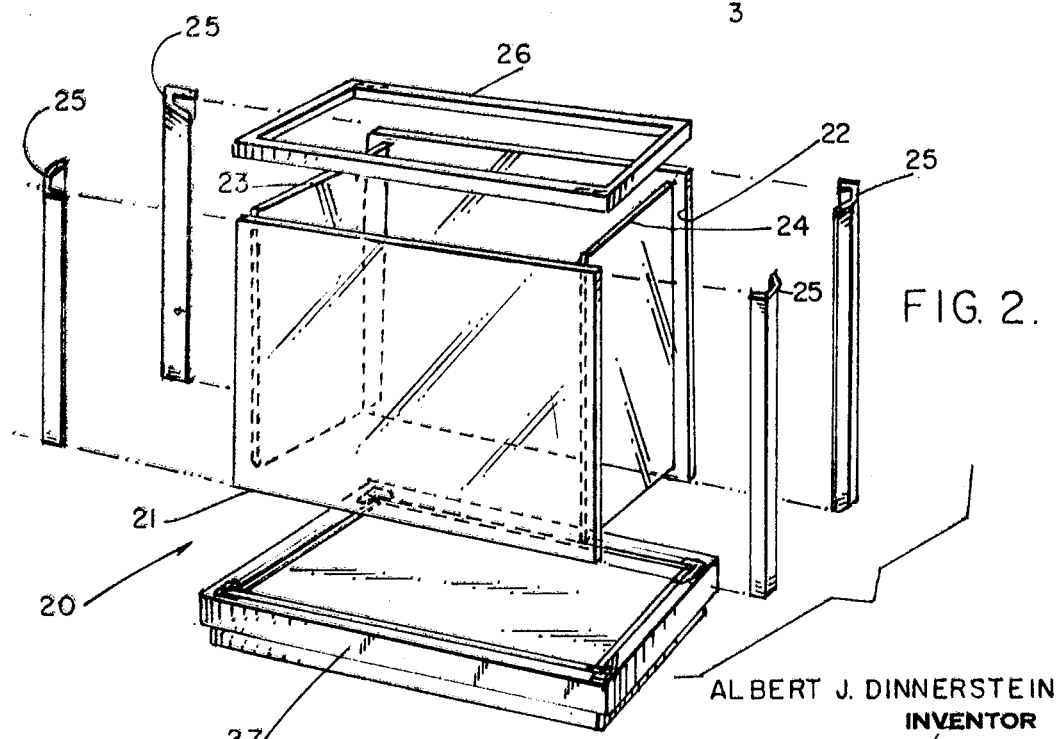
FIG. 2 represents an exploded perspective view of the aquarium.

The fish tank aquarium 20, according to the present invention, comprises, as illustrated in FIGS. 1 and 2, front and rear panels 21 and 22 respectively, left and right side panels 23 and 24 respectively, four corner brace members 25, top frame member 26, and base member 27. The panels are joined together in a rectangular array.

Figure 3:
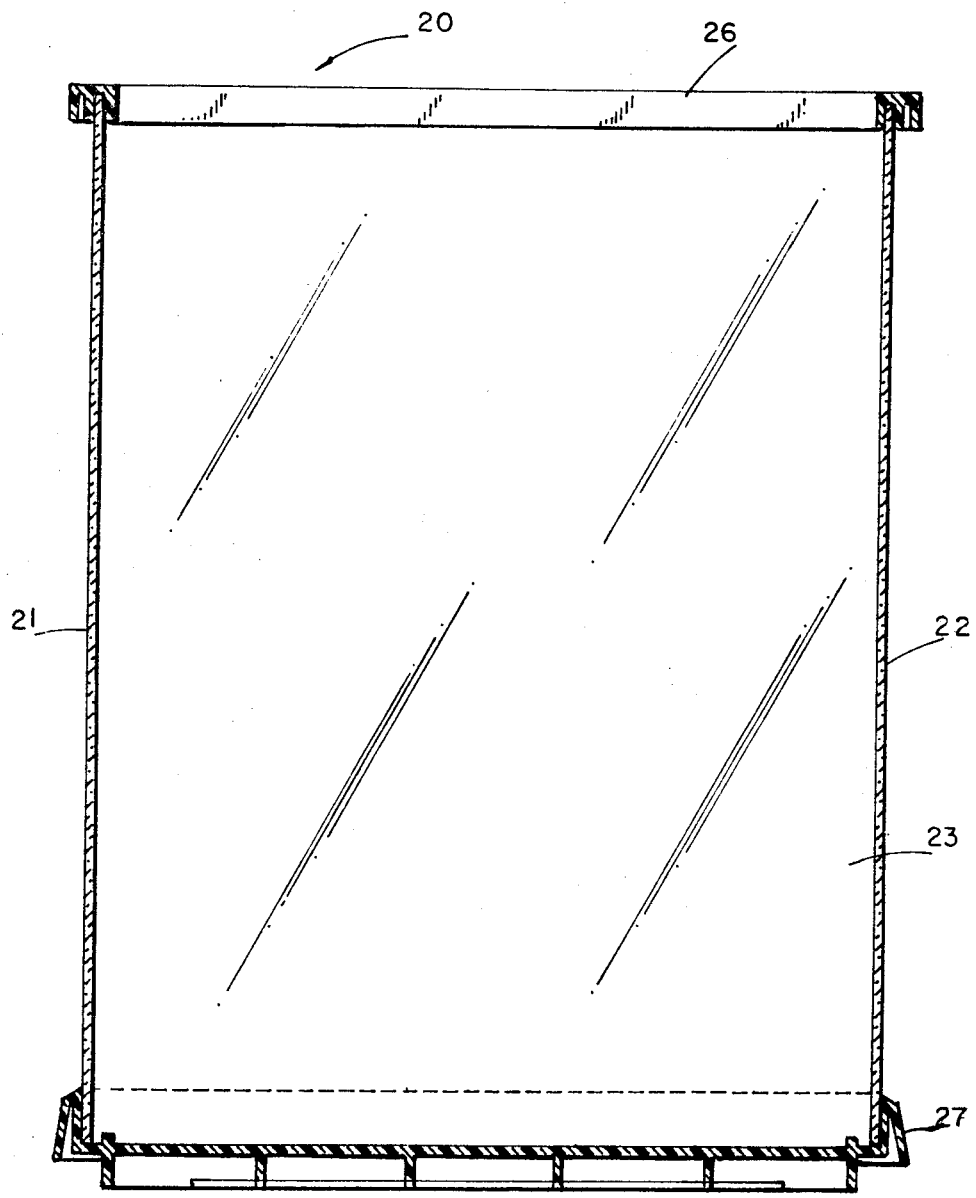
FIG. 3 represents a vertical sectional view taken along line 3—3 in FIG. 1.
Figure 4:
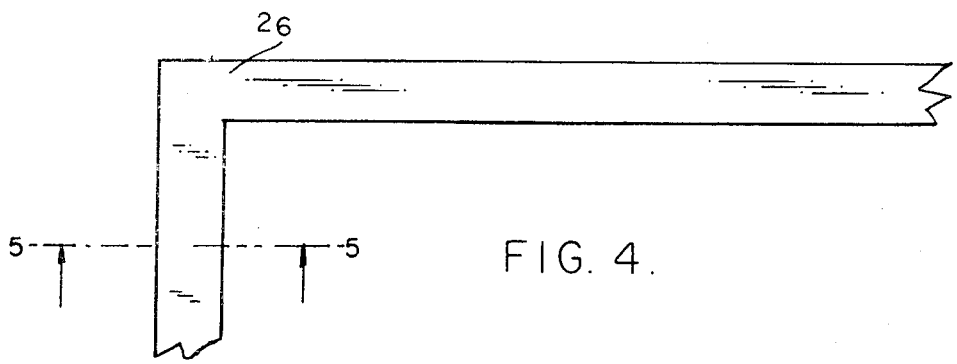
FIG. 4 represents a top plan view of a segment of the top frame member of the aquarium.

As shown in FIG. 3, the panels 21 and 22 are seated in grooves provided in the top frame member 26 and base member 27, which grooves will be discussed below.

Figure 5:
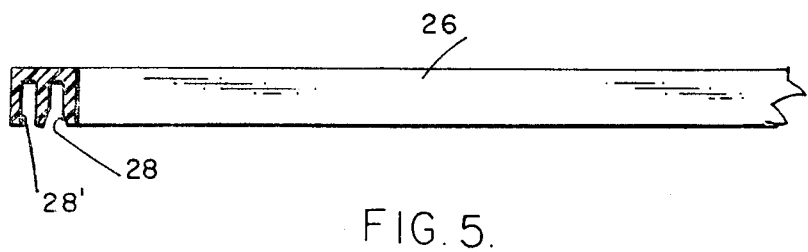
FIG. 5 represents a view partly in section taken along line 5—5 in FIG. 4.

The top frame member 26 includes a rectangular array of grooves for receiving the upper portions of the panels 21-24. FIG. 5 illustrates a section of groove 28 for receiving the left side panel 23. Adjacent groove 28 there is provided a groove 28' for receiving a stiffening or reinforcing member not shown in the drawings.

Figure 6:
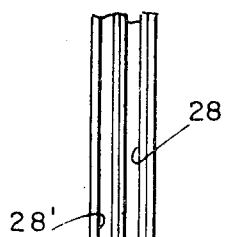
FIG. 6 represents a bottom plan view of a segment of the top frame of the aquarium.
Figure 6:
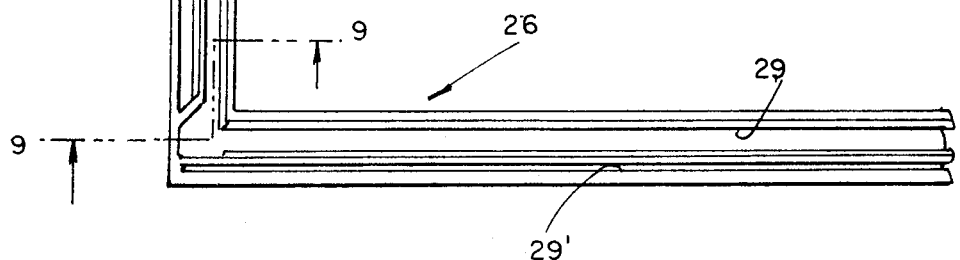

FIG. 6 illustrates a bottom plan view of a corner section of the top frame member 26 in which there are provided grooves 28 and 29 adjacent one another at a right angle relationship. Adjacent groove 29 there is provided a groove 29' for receiving a stiffening or reinforcing member not shown in the drawings.

Figure 7:
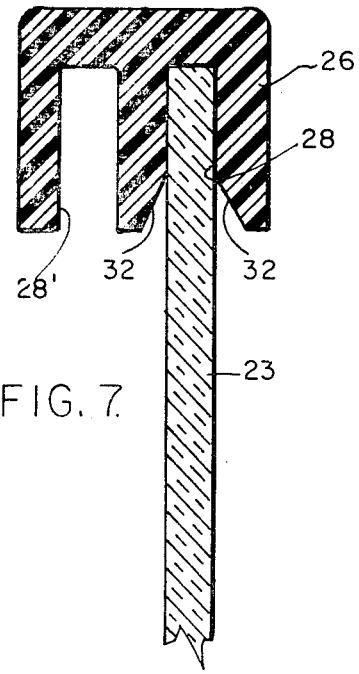
FIG. 7 represents a vertical sectional view taken along line 7—7 in FIG. 1.
Figure 8:
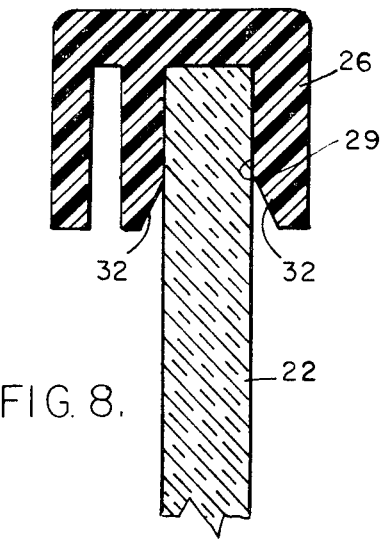
FIG. 8 represents a vertical sectional view tanken along line 8—8 in FIG. 1.
Figure 10:
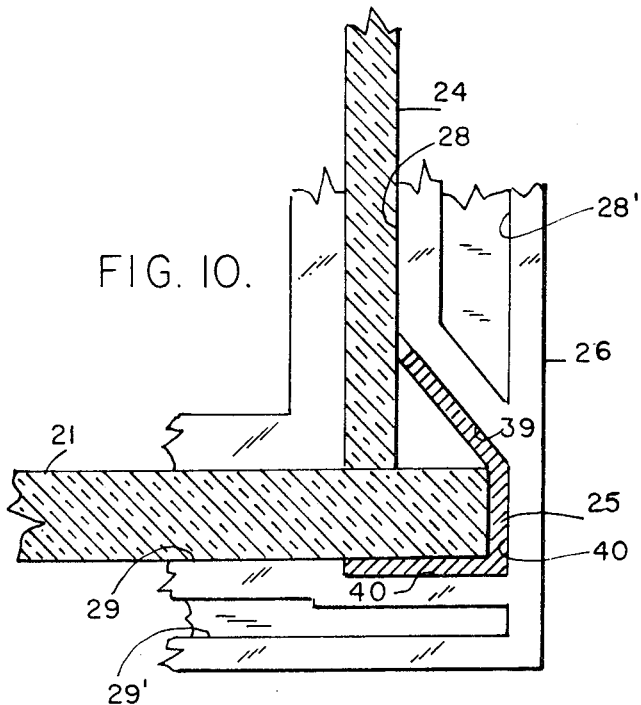
FIG. 10 represents a bottom plan view of the corner of the top frame illustrating, in section, two adjoining panels.

FIGS. 7, 8 and 10 illustrate that the front and rear panels, 21 and 22 respectively, are preferably thicker than the side panels 23 and 24, and that the respective grooves provided in the top frame member 26 and base member 27 are defined by opposing walls in flush relation with the panels, as will be discussed further below.

Figure 9:
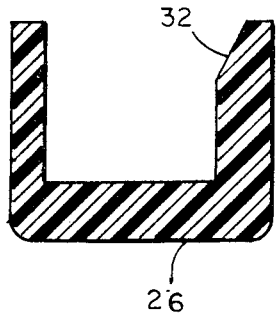
FIG. 9 represents a vertical sectional view taken along line 9—9 in FIG. 6.

FIG. 10 specifically illustrates that the right side panel 24 intersects the front panel 21 at a point on the latter remote from each of the opposite ends of the latter. In this manner, there is cooperatively defined generally an L-shaped section at each of the corners of the aquarium, which L-shaped section extends externally of the enclosure defined by adjoining and intersecting panels, wherein each corner portion is enlarged as shown in FIG. 9. In FIG. 10, the foot of the L-shaped section extends to the right. The braces 25 are utilized for bracing the adjoining panels defining the L-shaped section. The purpose of the L-shaped section will be discussed below.

The adjacent grooves 28, 29 merge with one another at the enlarged corners of the top frame member 26 so as to receive, in flush relation, the L-shaped section of adjoining panels and the brace members 25 associated with the adjoining panels. In this respect, as shown in FIG. 10, the groove 28 has a tapered portion 39 terminating in a straight portion 40 extending parallel to the groove 28, and therefore to the side panels 23 and 24. A notch 41 is provided in the groove 29 and terminates in abutting relation with the straight portion 40. It is these portions 39 and 40 together with the notch 41 that cooperatively embrace each brace 25 at one end thereof, and thereby each L-shaped section of adjoining panels. In the preferred embodiment portions 39 and 40 are inclined at an angle of 135° relative to one another.

The grooves 28 and 29 in the top frame member 26 have inclined portions 32, as shown in FIGS. 7–9, so that the panels can be press-fitted into the respective grooves.

Figure 11:
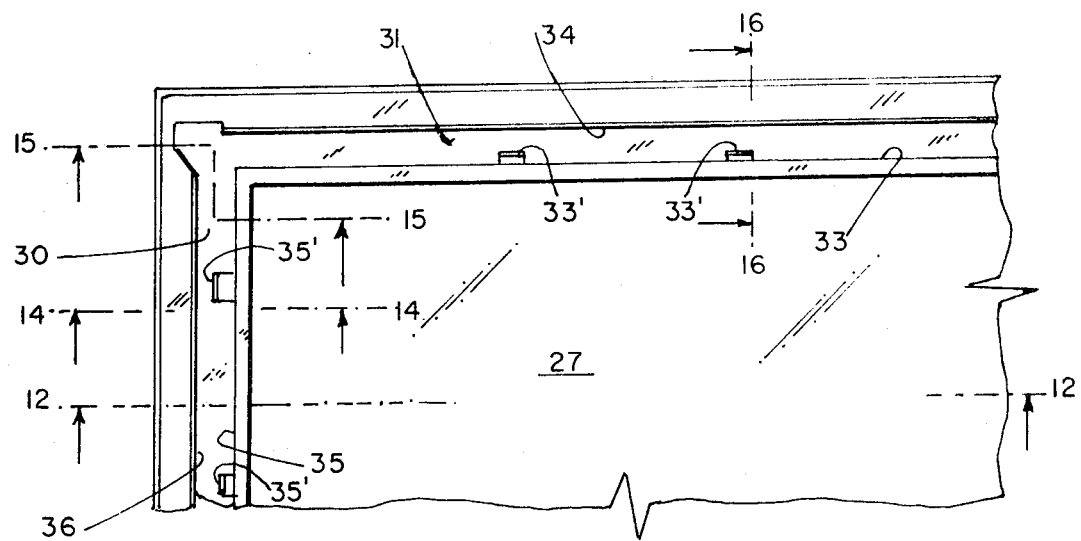
FIG. 11 represents a top plan view of a segment of the base.

FIG. 11 represents a plan view of a segment of the base member 27, illustrating the relationship of the grooves 30 and 31. The front and rear grooves 31 are defined by inner walls 33 and outer walls 34, whereas the side grooves 30 are defined by inner walls 35 and outer walls 36 as shown in FIG. 11.

Figure 12:
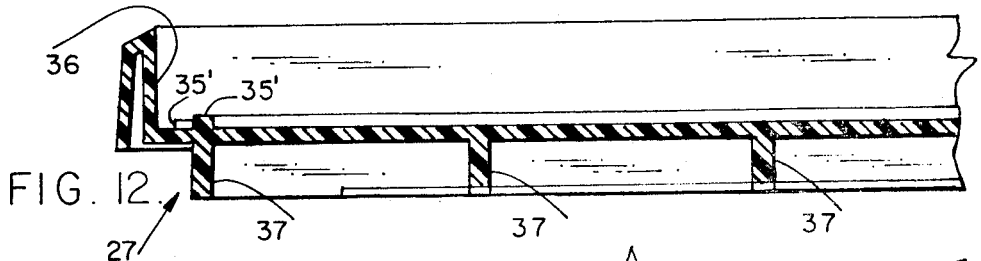
FIG. 12 represents a vertical sectional view taken along line 12—12 in FIG. 11.
Figure 13:
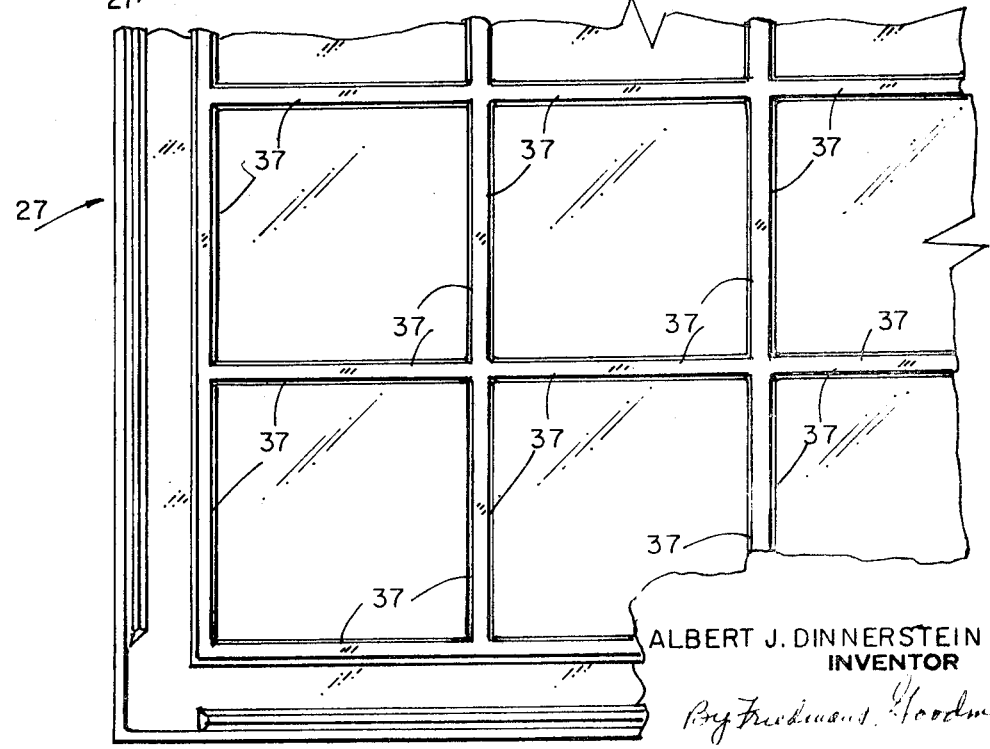
FIG. 13 represents a bottom plan view of the underside of a segment of the base.

The underside of the base 27 includes a grid portion of ribs 37 equally spaced from one another, both laterally and longitudinally of the base 27, as shown in FIGS. 12 and 13. These ribs act to reinforce and stabilize the aquarium.

Figure 14:
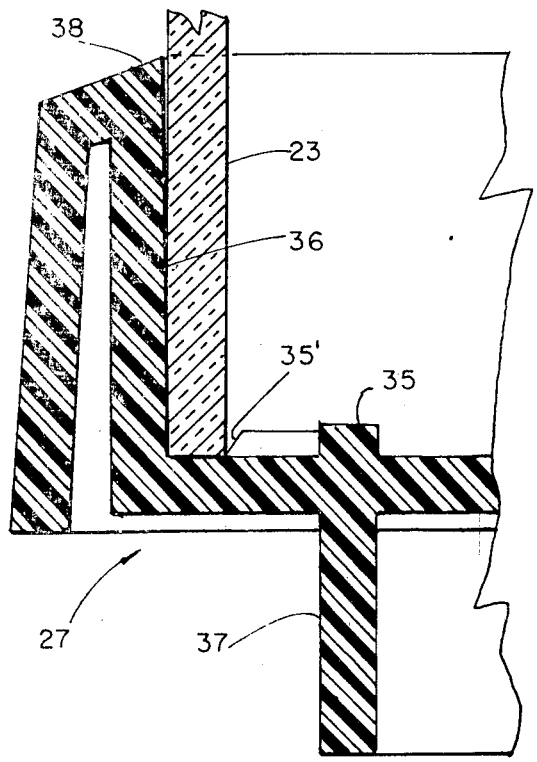
FIG. 14 represents a vertical sectional view taken along line 14—14 in FIG. 12.
Figure 15:
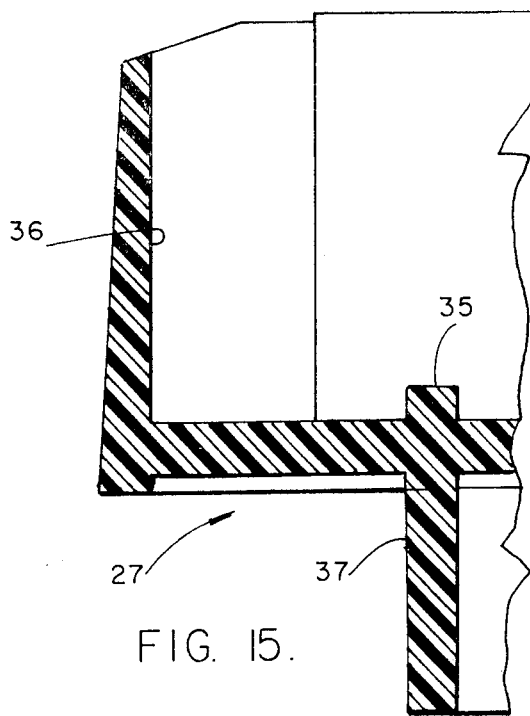
FIG. 15 represents a vertical sectional view taken along line 15—15 in FIG. 12.
Figure 16:
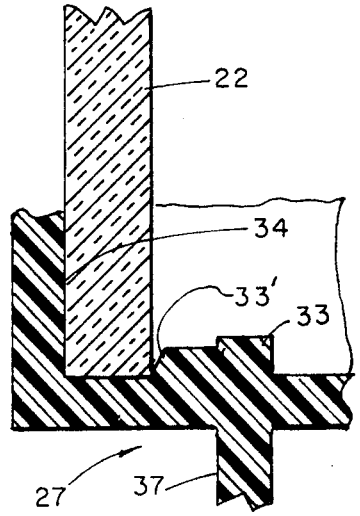
FIG. 16 represents a vertical sectional view taken along line 16—16 in FIG. 12.
Figure 17:
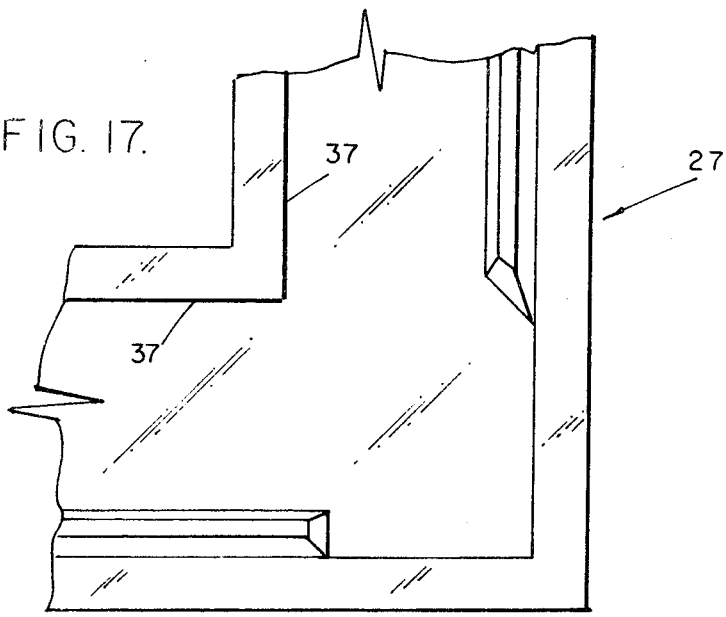
FIG. 17 represents a bottom plan view of a segment of the underside of the base.

As shown in FIGS. 14–16, the outer wall 36 and the outer wall 34 are each preferably constituted as an inverted U-shaped section 38, whereas the latter may be constituted as a single portion if desired. FIG. 15 illustrates the corner portion of outer wall 36 which is a transition from that of the U-shaped section 38 to that of the U-shaped section of the outer wall 34, wherein each of the corner portions are enlarged, as set forth hereinbelow.

Figure 18:
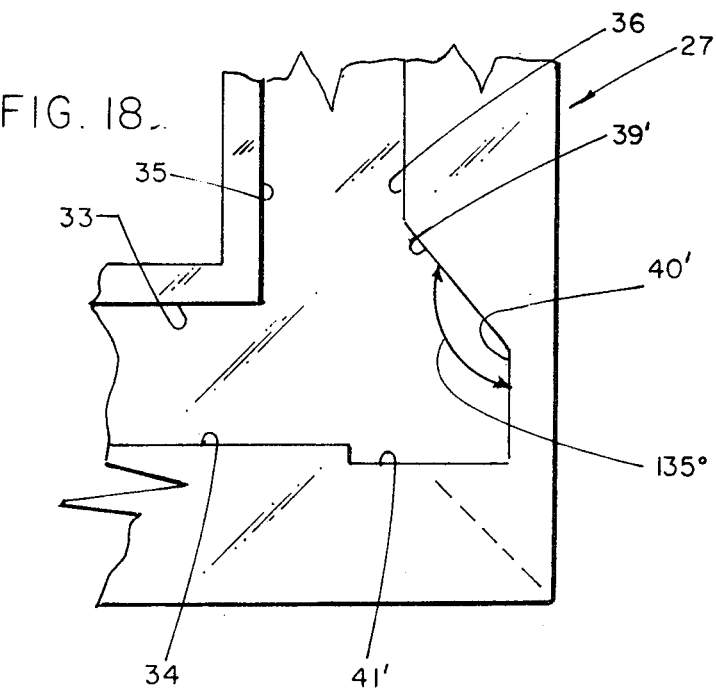
FIG. 18 represents a top plan view of the top side of a segment of the base.

The outer wall 36 and outer wall 34 merge with one another at the corners of the base 27 so as to receive, in flush relation, the L-shaped section of adjoining panels and the brace members 25 associated with the adjoining panels. In respect, as shown in FIG. 18, the outer wall 36 has a tapered portion 39' terminating in a straight portion 40' extending parallel to the outer wall 36, and therefore to the side panels 23 and 24. A notch 41' is provided in the outer wall 34 and terminates in abutting relation with the straight portion 40'. It is these portions 39' and 40' together with the notch 41' that cooperatively embrace each brace 25 at one end thereof, and thereby each L-shaped section of adjoining panels, wherein the outer end of each brace 25 is embraced by the portions 39, 40 and notch 41, as stated herein above. In the preferred embodiment portions 39' and 40' are also inclined at an angle of 135° relative to one another, similar to that of portions 39 and 40.

The inner walls 33 and 35 include tapered projections 33' and 35', as shown in FIGS. 11, 14, and 16, which function is to secure the panels in the grooves 30 and 31 respectively. A sealant may be used to secure the panels in water-tight fashion between these projections 33' and 35' in the grooves 30 and 31.

Figure 19:
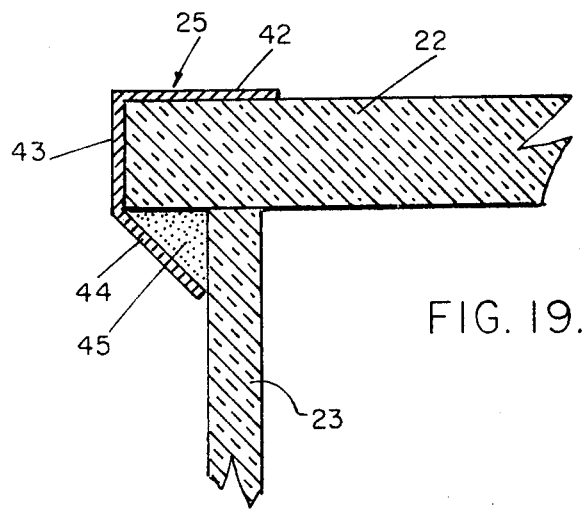
FIG. 19 represents a horizontal sectional view of two adjoining panels.

FIG. 19 illustrates the manner by which adjoining panels 22 and 23 are interconnected such that the L-shaped section defined thereby, with the foot thereof extending horizontally and to the left, is sealed to prevent fluid leakage. The corner brace member 25 includes two mutually perpendicular sections 42 and 43. The section 43 intersects panel 23 in a skew relation thereto at one end of the section 43. Section 43 of the brace member 25 forms a triangularly shaped enclosure cooperatively with the L-shaped section to envelop a sealant 45, such as air curing silicone, interposed therebetween externally of the enclosure defined by each of the adjacent panels. In this manner the sealant 45 is not directly exposed to the fluid deposited into the aquarium and is maintained as thickened or mound of much greater lateral dimension than that in conventional aquariums, the sealant being preferably self-hardening and adhesive.

Figure 20:
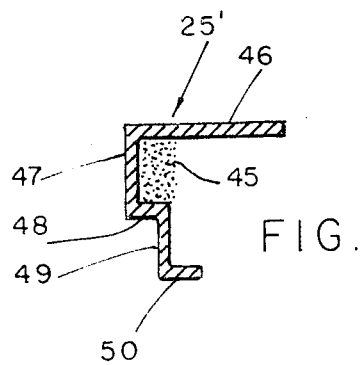
FIGS. 20-22 represent horizontal sectional views taken in sequence as illustrating the method for assembling the aquarium according to the present invention.
Figure 21:
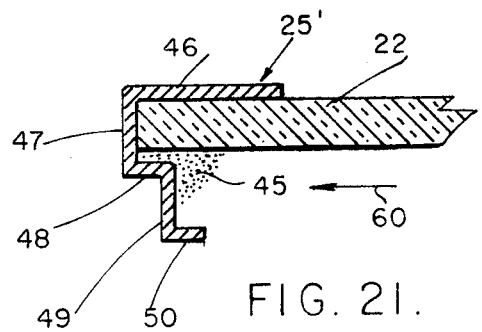
Figure 22:
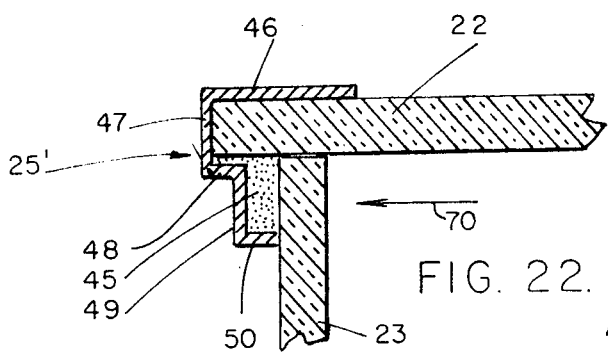

FIGS. 20–22 illustrate the method by which the panels 21–24 are assembled and in which there is utilized a modified version of the brace member 25, although the instant method is equally appropriate with employment of the corner brace member 25 fully discussed above.

In the modified version of the brace member 25', the latter includes two mutually perpendicular sections 46 and 47, section 47 having a lateral extent greater than the width of panel 22. Three mutually perpendicular, stepped-like legs 48, 49 and 50 extend from section 47 such that leg 50 intersects panel 23 at right angles therewith to envelope the L-shaped section defined by the adjoining panels 22 and 23. The sealant 45 is maintained as a thickened mass and free from direct exposure of the liquid in the aquarium.

The method of assembling the panels with one another is as follows:

a. deposition of sealant 45, preferably silicone, into the confines of sections 46, 47, and 48 of brace member 25';

b. insertion of panel 22 into the confines of sections 46, 47, and 48, in the direction of the arrow 60 of FIG. 21, in contacting relation with section 46, to displace substantially all of the sealant 45 into a mound within the confines of sections 48, 49, and 50 and the left-end portion of the panel 22, i.e., the leg of the L-shaped section defined by adjoining panels; and c. displacing panel 23 in the direction of the arrow 70 of FIG. 22, in sliding contacting relation with the panel 22 until panel 23 contacts the free end of the leg 50 of the brace 25' to cooperatively define an L-shaped enclosure section, and at the same time forcing the sealant mound to fill the L-shaped cross-section defined thereby, as shown in FIG. 22.

The panels are thusly joined to one another and then positioned into the respective grooves provided in the base member. The top frame member is then fitted on to the panels. Further sealant is used to seal the panels in the grooves and the aquarium is thus completed.

Numerous alterations of the structure and method herein disclosed will suggest themselves to those skilled in the art. However, it is to be understood that the present disclosure relates to a preferred embodiment of the invention which is for purposes of illustration only and not to be construed as a limitation of the invention.

What is claimed is:

1. In an enclosure having a plurality of adjoining panels each having opposite ends, the improvement comprising fluid sealing means for connecting adjoining panels to one another in fluid-tight relation such that one of said panels intersects its adjacent panel at a point remote from each of the opposite ends of said adjacent panel, said adjoining panels including mutually perpendicular end portions defining an L-shaped external corner section, said sealing means being disposed on said L-shaped section externally of said enclosure, corner brace means, said sealing means being interposed between said L-shaped corner section and said corner brace means, said sealing means being self-hardening and adhesive for securing said corner brace means to said L-shaped corner section, said corner brace means including a first portion in flush contacting relation with an end portion of said adjacent panel and a second portion extending from said first portion at a point remote from said one panel adjoining said adjacent panel, said second portion extending into intersecting relation with said one panel, said panels being arranged in a rectangular array, a base means including a base member and a portion providing a bottom for said enclosure, said enclosure including said base member and a top frame member between which are interposed the rectangular array of panels, said base member and said top frame member each being provided respectively with a rectangular array of grooves for receiving lower and upper portions of said panels and said corner brace means respectively.

2. In an enclosure as claimed in claim 1, wherein said second portion of the corner brace means and said one panel are mutually perpendicular relative to one another.

3. In an enclosure as claimed in claim 1, wherein said second portion of the corner brace means and said one panel are mutually skew relative to one another.

4. In an enclosure as claimed in claim 1, wherein the first and second portions of the corner brace means are co-extensive with the adjoining extent of the adjoining panels.

5. In an enclosure as claimed in claim 1, wherein said top frame member is provided with a further array of reinforcement receiving grooves.

6. In an enclosure as claimed in claim 1, wherein said top frame and base members are provided with corner grooves having a configuration for receiving in flush relation the corner brace means and L-shaped section.

7. In an enclosure as claimed in claim 6, wherein said base member portion providing said bottom includes a grid array of spaced reinforcing ribs.

8. In an enclosure as claimed in claim 7, wherein said base member ribs are equally spaced from one another both longitudinally and laterally, said base member ribs extending from a surface of the base member opposite to that surface of the base member in contact with said panels.

9. In an enclosure as claimed in claim 1, wherein said grooves in said base member and top frame member include a tapered portion on at least one side thereof respectively.

10. In an enclosure as claimed in claim 1, wherein said base member grooves are defined by an inner wall and an outer wall, said outer wall having an elevation greater than that of said inner wall.

11. In an enclosure as claimed in claim 10, wherein said outer wall of said base member grooves for receiving said panels are each constituted of an inverted U-shaped section.

12. In an enclosure as claimed in claim 1, wherein adjacent panels have respective thickness differing from one another, walls defining said grooves being spaced so as to receive the respective panels in relation to the respective thickness of the panels.

13. An aquarium tank comprising four mutually perpendicular adjoining panels with parallel first and second panels being disposed between parallel third and fourth panels; vertical ends of said first and second panels being disposed against said third and fourth panels with vertical edge portions of said third and fourth panels extending outwardly and being spaced from said first and second panel ends to define L-shaped external corner sections; joining means at said corner sections for connecting said panels to one another in a fluid-tight relation; said panels being disposed between a base member and a top frame member to define a rectangular enclosure; said base member and said top frame member both being provided with a rectangular array of groove means for receiving lower and upper horizontal edge portions of said panels respectively; at least one of said groove means of said base and top frame members including corner grooves provided with a configuration for receiving said L-shaped corner sections and said joining means; said groove means of said base member being defined by a base portion, an inner wall and an outer wall; said outer wall having a greater elevation than said inner wall from said base portion of said base member groove means.

14. An aquarium tank as claimed in claim 13, wherein each of said groove means includes a tapered portion on at least one side thereof to provide a wider opening at its mouth than at its base.

* * * * *